United States Patent

Noll

[15] 3,706,532

[45] Dec. 19, 1972

[54] METHOD FOR DETERMINING ZINC CONCENTRATION IN AQUEOUS MEDIUMS

[72] Inventor: Charles A. Noll, Philadelphia, Pa.

[73] Assignee: Betz Laboratories, Inc. Trevase, Pa.

[22] Filed: Aug. 20, 1971

[21] Appl. No.: 173,663

[52] U.S. Cl. ................23/230 R, 21/2.7, 23/230 A, 252/408
[51] Int. Cl. .........................G01n 31/22, G01n 33/18
[58] Field of Search .......23/230 R, 230 A, ; 252/408; 21/2.7

[56] References Cited

UNITED STATES PATENTS

| | | | |
|---|---|---|---|
| 2,583,891 | 1/1952 | Schwarzenbach | 23/230 R |
| 3,479,152 | 11/1969 | Overbeck et al. | 23/230 R |

OTHER PUBLICATIONS

J. J. Hickey et al., "Chelometric Titration For Zinc in Municipal and Industrial Water Supplies," Anal. Chem., Vol. 38, p. 932–934 (June 1966).

*Primary Examiner*—Joseph Scovronek
*Attorney*—Alexander D. Ricci

[57] ABSTRACT

The present disclosure is directed to a method for determining the zinc concentration in an aqueous medium. More specifically, the method is directed for use to aqueous mediums which contain contaminated and perhaps interfering metal ions, such as the cations of aluminum, iron and copper. According to the method, the sample of the aqueous medium is acidified, treated with a buffered complexing agent to complex any aluminum and iron ions present, treated with an organo-sulfur compound which will complex with any copper ions present and discriminate against any zinc ions present. An indicator compound which will react with the zinc to produce a color has been added to the aqueous medium and the color intensity of the resulting solution is ascertained. The color intensity is then compared with the color intensity of known quantities of zinc and the indicator compound, and the concentration of the zinc is ascertained accordingly.

14 Claims, No Drawings

METHOD FOR DETERMINING ZINC CONCENTRATION IN AQUEOUS MEDIUMS

BACKGROUND OF THE INVENTION

The technology of water treatment has reached a high degree of sophistication. Presently, many compounds are utilized in order to protect the metallic parts of large and expensive steam-producing apparatus, cooling systems and water conveying means. As is well known, whenever water is present and in contact with a metal structure, corrosion or scale deposition becomes a very significant problem. The areas of concern range anywhere from the metallic structure of the cooling water tower to the drilling or fractionating apparatus utilized in oil fields.

Zinc compounds, more specifically the zinc ion, has proven through the years to be a unique and seemingly unreplacable item in basic water treatment. At present, the cation of zinc is used as a cathodic corrosion inhibitor and is commonly combined with anodic corrosion inhibitors, such as phosphates and chromates, to produce what is accepted to be one of the most effective corrosion inhibitors ever produced. In addition, the use of a zinc cation in combination with various dispersants has provided a most successful alternative to treating aqueous systems which have the propensity for scale deposition. The art of treating cooling water systems, presently and in the past, has relied to a great degree on corrosion inhibitors containing zinc and scale deposition control agents which also contain a formulated zinc cation.

Although the corrosion inhibitors containing zinc and the dispersants which contain zinc are extremely effective for the purpose, the treatment must be controlled in order to maintain this effectiveness. This control is necessary for a number of reasons. For example, chemicals which can be used successfully in the treatment of water systems under certain treatment levels may act detrimentally to the systems when added in large amounts. In effect, the overfeed of the chemical transposes the chemical or its by-products into a contaminant which must be reckoned with since the chemical or its by-products may enhance scale formation, affect cycles of concentration, increase blowdown rates which operate adversely to the economics of the system, and because there is an increase in blowdown rates, there is the additional problem of contamination of the environment.

More specifically, the pollution aspects of the discharge of effluents from industrial systems have recently been the subject of much legislation on the federal, municipal and state level. Accordingly, discharges of this nature are under strict surveillance by the appropriate governmental agencies. Because of the concern regarding contaminating discharges, it has become most important to utilize only the exact amount of a water treatment additive to effect the purpose desired. As is obvious, this objective possesses at least two very apparent advantages—economic and pollutional. Accordingly, in order to attain the objective, it is desirable to have a quick, simple and effective method to determine the residual level of the additive in a particular water system. In this particular instance, of course, we are referring to the zinc cation. Along the same lines, it is also desirable to have a simple method for measuring the additive content, in this case the zinc cation, not only in the systems being treated, but also to measure the amount of the additive in any effluents which might be discharged to any streams, ponds, lakes, etc. to ascertain whether the discharge meets the expectations and requirements of the various statutes.

Accordingly, it is the objective of the present invention to provide a relatively simple and effective method for determining the zinc ion concentration of a particular aqueous system and, more particularly, an aqueous system which contains additional and perhaps conflicting metal cations.

The problem of devising a test for the measurement of the concentration of zinc cation in an aqueous solution was somewhat of a difficult one because the aqueous systems wherein a zinc cation is found also generally contain an aluminum ion, iron ion and copper ion. In order to accurately test for zinc concentration of an aqueous solution containing at least one or perhaps all of the ions of iron, aluminum and copper, the contaminating ions previously had to be extracted since they either conflicted with the reaction of the zinc ion with a particular compound indicator or in fact reacted with the indicator itself to give false and, of course, high readings.

The method which was being utilized in the field prior to the advent of the present invention included the use of potassium cyanide. In accordance with the method, potassium cyanide, or an equivalent, was added to an aqueous medium which had been made alkaline. The potassium cyanide reacted to fix all the metal cations in solution, i.e. the ferrous and ferric ions, the copper ions, the manganese ions and the zinc ions. The aqueous solution was then extracted with an organic solvent such as chloroform. To the extraction was then added an aqueous formaldehyde. The aqueous formaldehyde broke the zinc cyanide complex and allowed the zinc to pass into the aqueous phase which separated out. To the aqueous phase was added a reactant indicator compound such as xylene orange, erichrone black, etc. The intensity of the color thus obtained was then directly compared with the intensity of color of solutions containing known quantities of zinc reacted with known quantities of xylene orange or the erichrone black, etc. As is evident, this procedure is not only cumbersome and time-consuming, but also dangerous. For example, if one neglected to make the aqueous sample medium alkaline, the addition of potassium cyanide to an acidic solution would produce the gaseous hydrocyanic acid which is well known as extremely poisonous and may cause fatality. Because of the same problem, the reagents which were used in performing the test had to be first treated with alkaline chlorine water, or equivalent, in order to destroy any cyanide present. Any leakage of the discarded material which had not been detoxified would cause serious injury to anybody who came in contact with the discharge, and if the discharge were allowed to exit into a stream, the marine life in the immediate area would certainly be affected drastically. The fact that the test was cumbersome is evident from the steps which must ordinarily be followed.

Because of the foregoing problems associated with the test being used in the field to determine zinc concentration, it was evident to the present inventor that a new test procedure must be devised. The method had to be free of the attendant disadvantages found in the prescribed procedure and, moreover, the procedure had to be rather simple, non-time-consuming, safe and capable of being run by someone who was not necessarily chemically educated or trained. Basically, the procedure had to be one which a water systems operator could follow quickly and easily to permit a number of tests to be conducted over a short period of time.

GENERAL DESCRIPTION OF THE INVENTION

The present inventor ascertained that the foregoing objective could be fully realized by the utilization of the method as hereinafter described. The method obviously will reveal not only the concentration of the zinc which is present in the aqueous systems, but also its existence; and, accordingly, the test could be used for this purpose. In some instances it may be desirable to ascertain whether in fact this cation is present without necessarily requiring that its concentration be known. In any event, the aqueous sample which allegedly contains the zinc normally will contain at least one of and perhaps all of cations of ferrous, ferric, aluminum, and copper. The initial step in the process requires that it be assured that the aqueous medium is within a pH of from about 4 to about 7. Obviously, if the aqueous medium upon testing of pH is found to be alkaline, then the pH is lowered to the acidic to neutral range described above by the addition of any normal mineral acid, i. e. hydrochloric acid, sulfuric acid, nitric acid or phosphoric acid. To the acidified medium is then added what is called a buffered complexing agent. The reason for the use of the buffered complexing agent is twofold. Initially, the buffer maintains the pH of the aqueous medium in the proper range while at the same time providing for the reaction of any iron or aluminum with the fluoride to produce a complex which is not only colorless, but also water soluble. A typical buffered complexing agent will be described later in this disclosure. In the event that there is no iron or aluminum present, the addition of the buffered complexing agent will not present a problem since it is water soluble and will remain in solution and does not add any color to the particular aqueous medium. To the aqueous medium is then added an organic sulfur compound which is capable of complexing any copper present but will not complex with the zinc cation. In essence, the complexing agent must discriminate between copper and zinc and share a preference for the copper. To the aqueous medium is then added an indicator compound which will in fact react with any zinc cation present to produce a color. The intensity of the color produced will bear a direct relationship to the amount of zinc present in the aqueous system. By comparing the color intensity of the solutions containing known quantities of zinc cation reacted with the particular indicator compound, an accurate reading of the amount of zinc in a particular aqueous medium can be realized.

In order to obtain true colors and to obtain a proper reading of the color intensity, it is advisable to filter the aqueous medium or aqueous sample prior to its subjection to the steps recited above. In addition, in order to ascertain whether in fact the aqueous sample is acidic or alkaline, indicators such as bromophenol blue, bromothymol blue, methyl orange, etc. and any indicator which would give an indication that the medium is between a pH of 4 and 7, could be utilized. If in fact the indicator used has a color which is blue and the indicator when added to the aqueous sample casts a blue color, a mineral acid, such as sulfuric acid, should be added dropwise until the blue color is destroyed. At that time, it is assured that the aqueous sample has a pH within which the test can be run accurately.

The buffered complexing agent which is initially added to the aqueous sample may comprise any one of the following: an alkali metal fluoride, an alkali metal citrate or an alkali metal tartrate may be used as the complexer for the aluminum and the iron; an alkali metal acetate, formate or propionate may be utilized as the buffer salt; and acetic acid, formic acid or propionic acid may be utilized as the acid of the buffered complexing agent. Although each of the ingredients which comprises the buffered complexing agent may be added separately to the aqueous sample to be tested, it is more practical and an expedient for field testing that the agent be made as a single composition. The buffered complexing agent may be produced as follows: 150 grams of chemically pure sodium acetate was added to approximately 500 milliliters of double distilled water contained in a beaker which was equipped with a magnetic stirring apparatus containing a Teflon-coated stirring bar. The aqueous solution was stirred until the sodium acetate was completely dissolved. To the resulting solution was added 15 grams of chemically pure sodium fluoride. The mixture was stirred until all the fluoride was dissolved. 400 milliliters of the double distilled water was then added with stirring. The probes of a pH meter were then placed in the mixture to obtain a pH reading. While the pH of the meter was registering, the solution was titrated with glacial acetic acid until the pH of the mixture had reached approximately 6.2. The resulting solution was then made up to one liter and allowed to cool. Since the buffered complexing agent will be used in proportion to the amount of sampled specimen which is commonly 25 grams, the buffer should contain from 0.015 to about 0.03 parts by weight of the alkali metal fluoride, citrate or tartrate per each 25 parts by weight of the water specimen; from about 0.05 to about 0.3 parts by weight of the alkali metal acetate, formate or propionate per 25 parts by weight of the aqueous specimen; and from about 0.008 to about .003 parts by weight of the acetic acid, formic acid or propionic acid per 25 parts by weight of said aqueous sample. If in fact individual components of the complexing agent are to be used rather than the mixture, then the same proportions may be utilized. These proportions are merely guidelines and any worker-in-the-art who is made aware of the concept of the invention can prepare the agent with any concentration of the individual ingredients as long as the agent in fact performs its function, that is to complex any ferrous, ferric and/or aluminum ion which is present in the aqueous sample.

The organic sulfur compound which is utilized to render inert any copper present or, more specifically, to complex it to form a water-soluble color compound is preferably 3,5-dimethyl tetrahydro-1,3,5,2H-thiadiazine-2-thione or a derivative thereof (homolog, analog, isomer, etc.). In addition, compounds such as thioacetic acid and its derivatives may also be used for this purpose. Any compound which can effectively discriminate between any copper or zinc ions present to thereby complex with the copper to form a water-soluble colorless or colored complex is suitable for this purpose. The reason for this requirement is that copper ions will in fact form a color with indicator compounds with which zinc will normally react to form a color reaction product. Accordingly, in order to avoid any misreadings because of the inclusion of the copper ion, the copper ion must be rendered inert to the possible reaction with any indicator compound utilized. The copper complexing agent may be prepared by merely dissolving 10 grams of the compound chosen in double distilled water. Since compounds such as the thione mentioned above are sparingly soluble in water, 10 grams of the thione may be adequately mixed, dissolved and dispersed in one liter of double distilled water. The solution should be mixed thoroughly and stored in a tightly closed vessel. Although the specific copper complexing agent has been made with 10 grams, if heavy proportion is placed on the basis of the 25 gram sample of aqueous solution, the copper complexing agent may be added to a 25 gram sample in an amount ranging from 0.0003 to about 0.02 parts by weight.

The indicator compound which will ultimately react with the zinc to produce the color may be a compound such as xylenol orange or any indicator compound which will react with zinc and not with the complexed copper to form a color compound having a measurable intensity. An indicator compound may be prepared as follows: 3 grams of purified xylenol orange is added to approximately 900 milliliters of double distilled water and stirred using a magnetic device containing a Teflon-coated stirring bar. The stirring is continued until complete dissolution of the xylenol orange in the double distilled water is observed. The solution is then made up to one liter, again mixed thoroughly and stored in a tightly closed vessel until used. On the basis of a 25 gram sample, the indicator compound may be added to the stated 25 gram sample in an amount ranging from 0.0015 to about 0.006 parts by weight.

At this time, it would be advisable to point out that in using the test method of the present invention, that certain standardizations must be made. The entire substance of the method resides in the measurement either electronically or by visual comparison of the color intensity of the sample solution which has been treated in accordance with the present invention.

More specifically, a certain proportion of the test solution when utilized in conjunction with a certain amount of liquid samples will yield a distinct color intensity. The color intensity may then be measured or be compared to the intensity of solutions which contain known quantities of zinc cation and which have been treated in accordance with the test procedure. In this manner the concentration of the zinc ion in the sample can easily be ascertained. However, more economically and as customarily utilized in the field, Taylor slides are produced, which slides are the same in color intensity as the color of the corresponding samples of liquid containing known concentrations of zinc ion. The sample solution can then be compared visually with the Taylor slides. The use of Taylor slides has been very successful in other areas and operate quite satisfactorily in accordance with the present invention. Moreover, the use of Taylor slides adds a distinct advantage in that it is economical and does not require expensive electronic equipment to make on-the-spot determinations.

If desired, the color intensity may be measured electronically with the use of a Leitz-Rouy photometer, a Beckman photometer or a Klett photometer. The procedure utilizing this method of determining zinc concentration merely entails taking readings in "dials" on a blank of the sample of aqueous medium, carrying out the inventive test procedure on another sample, making a reading in "dials" on the photometer and comparing the reading minus the blank reading to readings obtained by using samples containing known amounts of zinc which have been treated in accordance with the inventive method. A standard chart or curve is then prepared using this technique which then provides a ready reference and a rapid reading of the test results.

EXEMPLARY TEST PROCEDURE

A 60 milliliter sample of water which is to be measured for its zinc concentration was filtered through a No. 5 Whatman filter paper, or equivalent. The filtrate was caught in a 100 milliliter beaker. To the filtrate was added two drops of bromophenol blue solution. If the color was blue, there was added dropwise a one normal sulfuric acid solution. The acid was added until the blue color was destroyed. To a 25 milliliter sample of the filter-treated sample was added one milliliter of the acetic-fluoride buffer complexing agent as prepared as described above and mixed thoroughly for about 30 seconds. To the sample solution was then added 0.5 milliliter of the copper complexing buffer and the resulting solution was then mixed thoroughly. The solution was then poured into a 5 × 10 mm Leitz glass cell and was used to zero-in the Leitz photometer. When this was accomplished, the solution in the cell was poured back into the beaker and mixed thoroughly with 0.5 milliliter of the xylenol orange indicator compound as prepared as described above. The resulting solution was mixed thoroughly and then poured into a 5 × 10 mm Leitz glass cell which had been precleaned to remove all finger marks, dirt, etc. The cell was then inserted in the photometer and the dial read using a 580 m$\mu$ glass filter cell. The dial readings were obtained using this procedure and using a standard zinc solution which contained from 0 to 6 parts per million.

PREPARATION OF STANDARD CURVES

A solution of pure zinc as made according to Standard Methods, 13, (1971), was made containing respectively from 0 to 6 parts per million of zinc. 25 milliliter samples of respective solutions were measured and treated in accordance with the procedure described immediately above except that the solutions were not filtered. A curve was prepared which plotted dial readings versus parts per million zinc. The readings versus the concentrations determined in accordance with the above-described procedure were as follows:

TABLE 1

| ppm Zinc in Sample Solution | Dial Readings |
| --- | --- |
| 0.0 | 62 |
| 1.0 | 120 |
| 2.0 | 172 |
| 3.0 | 220 |
| 4.0 | 263 |
| 5.0 | 293 |
| 6.0 | 320 |

Although the curve was produced with solutions containing a maximum of 6 ppm zinc, it is evident that curves for solutions containing greater concentrations of the zinc can be easily produced. Since the primary field of use for the present invention is the water treatment field, the illustrations supporting the invention have been consonant with the amount of zinc that is customarily used and found in these systems. The method can be utilized with solutions where the concentration of zinc is higher; of course, certain modifications will be required to the concentrations of the reagents used or the zinc solutions may be diluted and the results increased equivalently with the degree of dilution.

SPECIFIC MEASUREMENT

In order to establish the accuracy of the inventive method, various water samples were taken from facilities located throughout the United States. The samples were taken from cooling water systems which were being treated with either a corrosion inhibitor and/or a dispersant of which zinc was an ingredient. For comparative purposes, duplicates of the various samples were subjected first to "Atomic Adsorption" to determine the zinc content and then to the method of the present invention as described earlier and using the specific reagents. The preparation of each was also described earlier. The results were as recorded in Table 11.

TABLE 11

| Company | ppm Zinc by Atomic Adsorption | Dials Reading | Ppm Zinc by Instant Method Conversion |
|---|---|---|---|
| Company A (Texas) | 0.2 | 96 | 0.5 |
| Company B (West Virginia) | 0.5 | 100 | 0.6 |
| Company C (West Virginia) | 6.6 | 326 | 6.6 |
| Company D (Texas) | 2.5 | 224 | 3.1 |
| Company E (Pennsylvania) | 4.1 | 266 | 4.1 |
| Company F (Texas) | 1.3 | 142 | 1.4 |
| Company G (Ohio) | 1.9 | 158 | 1.7 |
| Company H (Virginia) | 2.1 | 174 | 2.0 |
| Company I (Wisconsin) | 2.9 | 208 | 2.7 |
| Company J (Wyoming) | 1.8 | 158 | 1.7 |
| Company K (Kentucky) | 2.4 | 178 | 2.1 |
| Company L (Ohio) | 2.2 | 198 | 2.5 |

From the foregoing comparison, it was concluded that the inventive method performed with a degree of accuracy which was acceptable. It should be realized, of course, that in utilizing a spectrometer for analysis, that an expensive and large piece of apparatus is being used. Moreover, when a great many tests are being performed and the data is required immediately and at a location quite distant from the location of a spectrometer, the spectrometer is not helpful. In addition, most concerns do not have spectrometers at their immediate disposal. Accordingly, the present invention bridges the obviously technological and economical gap.

CONFLICTING ION TEST

As with every simple and quick analytical test, there is always the concern as to what effect dissolved ions or materials will have on the accuracy of the test. Accordingly, sample solutions of zinc were prepared to which were added various other metals and related ions. The solutions were then subjected to the inventive method and the results obtained were compared to the known quantities of zinc added. The ingredients added and the results obtained are recorded in the following Table 111.

TABLE 111

| Ion or Compound Added | ppm of Ion Compound Added | ppm Zinc Added | ppm Zinc Found |
|---|---|---|---|
| Ca as $CaCO_3$ | 400 | 2.0 | 1.9 |
| Mg as $CaCO_3$ | 100 | 2.0 | 2.1 |
| $Cu^{+2}$ | 2.5 | 2.0 | 2.0 |
| $Fe^{+3}$ | 2.0 | 2.0 | 2.0 |
| $Fe^{+2}$ | 2.0 | 2.0 | 2.0 |
| NaCl as Cl | 400 | | |
| $Na_2SO_4$ as $SO_4$ | 500 | 2.0 | 2.0 |
| Organo-phosphonate | 4 | 2.0 | 2.0 |
| $K_2Cr_2O_7$ as $CrO_4$ | 50 | 2.0 | 2.0 |
| $Na_2HPO_4$ as $PO_4$ | 50 | 2.0 | 2.0 |
| $Al_2(SO_4)_3$ as Al | 4 | 2.0 | 2.0 |
| $NaHCO_3$ as $CaCO_3$ | 400 | 2.0 | 2.0 |
| $Cu^{+2}$ 2.5 + $Fe^{+3}$ | 2.0 | 2.0 | 2.0 |
| Amino-organo phosphonate | 0.5 | 2.0 | 2.0 |

It was apparent from the foregoing that none of the ions or compounds added conflicted with the accuracy of the inventive method.

SIMULATED COOLING WATER

Since corrosion inhibitors and/or dispersants containing zinc are commonly used in cooling water systems, it was deemed advisable to produce a water containing dissolved and undissolved ingredients which would be closely related to the consistency of an actual cooling water. If the method performed accurately in the sample aqueous environment, then the method would be of immediate technical and commercial value.

The simulated cooling water contained the following:

| | |
|---|---|
| 200 ppm | Ca as $CaCO_3$ |
| 50 ppm | Mg as $CaCO_3$ |
| 5 ppm | Organo-phosphonate |
| 1 ppm | $CuSO_4$ as $Cu^{+2}$ |
| 2 ppm | $FeCl_3$ as $Fe^{+3}$ |
| 200 ppm | $Na_2SO_4$ as $(SO_4)^-$ |
| 100 ppm | NaCl as $Cl^-$ |
| 50 ppm | $NaHCO_3$ as $CaCO_3$ |
| 20 ppm | $Na_2Cr_2O_7$ as $CrO_4^-$ |
| 10 ppm | $Na_2HPO_4$ as $(PO_4)^{---}$ |
| 1 ppm | $Al_2(SO_4)_3$ as $Al^{+3}$ |
| pH = 5.5 | |

To various samples of simulated cooling water was added respectively 0, 2 and 4 ppm zinc as zinc cation. The samples were subjected to the test as described and the zinc concentrations determined were respectively 0.2, 2.2 and 4.2. Accordingly, the method performed quite satisfactorily under the adverse conditions tested, i. e. the possibility of conflicting ions, materials, etc., and the results obtained were considered to be quite good. Equally impressive is the fact that the results were obtained rather rapidly which is a crucial concern in many operations.

The method obviously has many uses even outside the field of water treatment. In addition, the general concept has many possibilities. If, for example, exact data was desired utilizing the method, the method could be modified to incorporate titration techniques. The results would be more accurate and could be carried to many decimal places, if necessary. The remaining ramifications and uses will be obvious to the skilled artisan.

Having thus described the invention, what we claim is:

1. A method for determining the presence and/or concentration of zinc in an aqueous medium containing dissolved therein at least one additional metal selected from the group consisting of iron, aluminum and copper which comprises assuring that the aqueous medium is within a pH of from about 4 to about 7; adding to said medium a buffered complexing agent which will effectively complex any iron and aluminum present; adding an organic sulfur copper complexing agent, said agent being capable of complexing any copper present but not said zinc; adding an indicator compound which will react with said zinc to produce a color; and ascertaining the color intensity of the resulting solution.

2. A method according to claim 1 wherein the color intensity is ascertained by comparison with the color intensity of standard solutions which respectively represent known zinc concentrations.

3. A method according to claim 1 wherein the aqueous medium is alkaline and its acidity is assured by addition of a mineral acid.

4. A method according to claim 3 wherein the pH of said medium is about 6.

5. A method according to claim 1 wherein said buffered complexing agent is an alkali metal acetate-alkali metal fluoride buffer.

6. A method according to claim 1 wherein said organic sulfur copper complexing agent is 3,5-dimethyl tetrahydro-1,3,5,2H-thiadiazine-2-thione.

7. A method according to claim 1 wherein said indicator compound is xylenol orange.

8. A method according to claim 1 wherein the aqueous medium is initially filtered to remove any undissolved matter.

9. A method according to claim 1 wherein
   a. the buffered complexing agent contains the following ingredients on a part by weight per 25 parts by weight of aqueous medium:
      i. from about 0.015 to about 0.03 parts of an alkali metal fluoride,
      ii. from about 0.05 to about 0.3 parts of an alkali metal acetate, formate or propionate; and
      iii. from about 0.008 to about 0.003 parts of acetic, formic or propionic acid;
   b. the copper complexing agent is 3,5-dimethyl tetrahydro-1,3,5,2H-thiadiazine-2-thione and the agent is added in an amount of from about 0.003 to about 0.02 parts by weight per 25 parts by weight of said aqueous medium; and said indicator compound is xylenol orange and is added in an amount of from about 0.0015 to about 0.006 parts by weight per 25 parts by weight of said aqueous medium.

10. A method according to claim 9 wherein the aqueous medium is filtered initially.

11. A method according to claim 9 wherein the aqueous medium is a sample taken from a cooling water system.

12. A method according to claim 11 wherein the aqueous medium is filtered initially.

13. A method according to claim 9 wherein the color intensity is ascertained by comparison with the color intensity of standard solutions which respectively represent known zinc concentrations.

14. A method according to claim 13 wherein the aqueous medium is filtered initially.

* * * * *